July 29, 1924.

C. A. FRUITT

DIRECTION SIGNAL

Filed June 2, 1923

INVENTOR
CHARLES A. FRUITT
BY
ATTORNEY

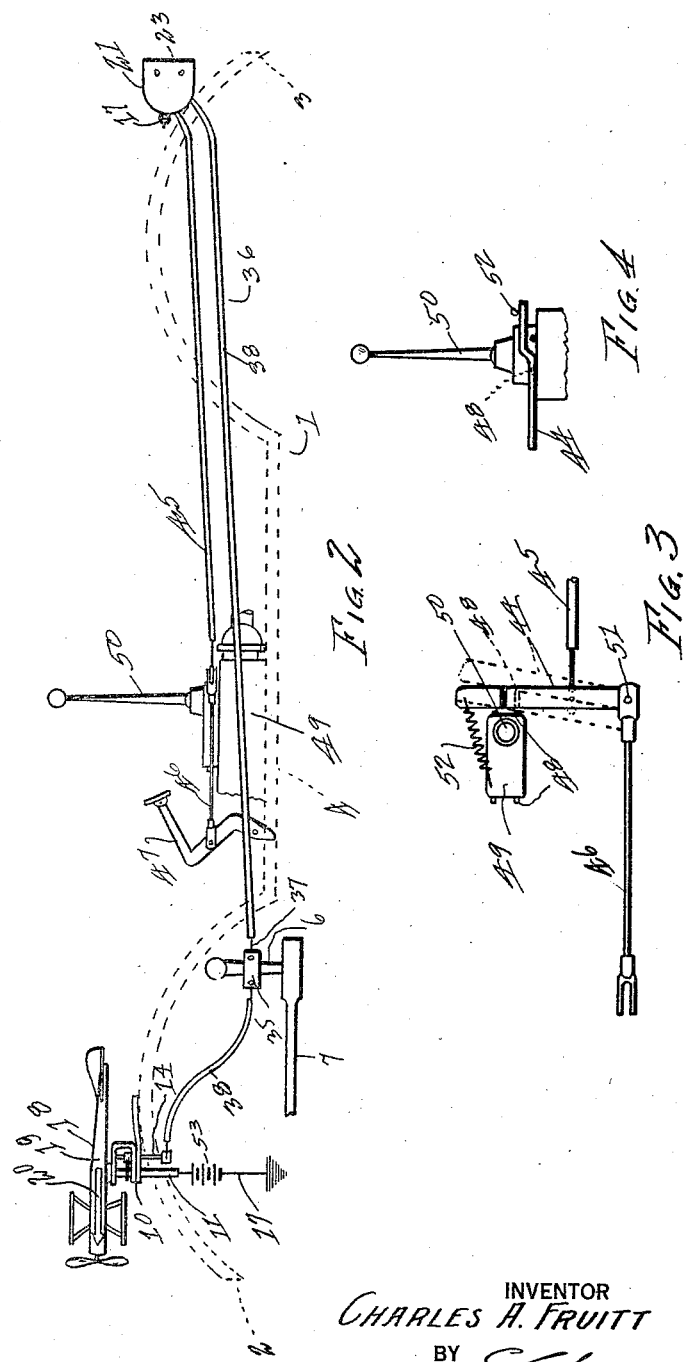

July 29, 1924.
C. A. FRUITT
1,502,664
DIRECTION SIGNAL
Filed June 2, 1923
3 Sheets-Sheet 3
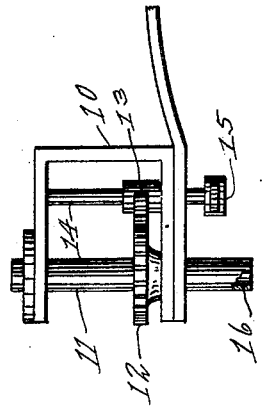
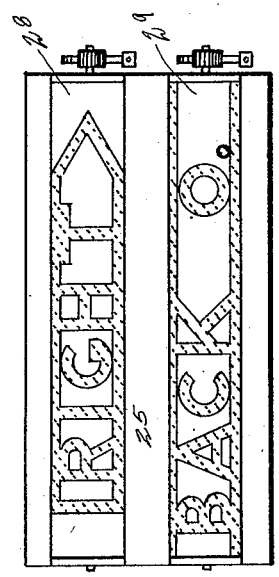
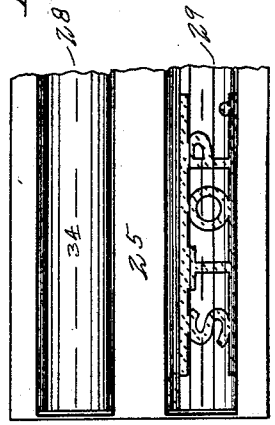
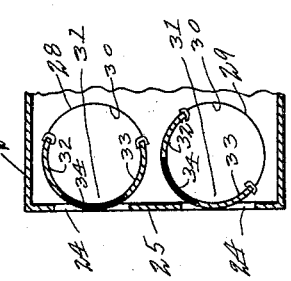
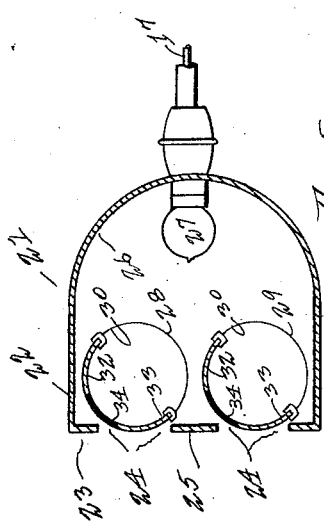
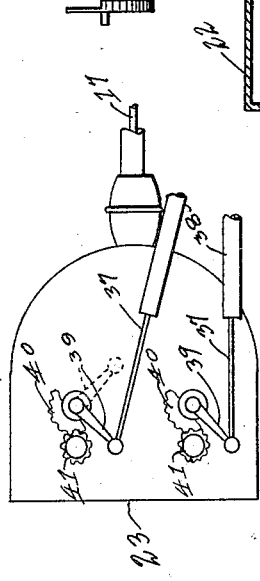
INVENTOR
*Charles A. Fruitt*
BY
*[signature]*
ATTORNEY Patented July 29, 1924.

1,502,664

UNITED STATES PATENT OFFICE.

CHARLES A. FRUITT, OF WALLA WALLA, WASHINGTON.

DIRECTION SIGNAL.

Application filed June 2, 1923. Serial No. 642,905.

*To all whom it may concern:*

Be it known that I, CHARLES A. FRUITT, a citizen of the United States of America, residing at Walla Walla, in the county of Walla Walla and State of Washington, have invented certain new and useful Improvements in Direction Signals, of which the following is a specification.

This invention relates to direction signals and has as one of its objects to provide a means whereby the contemplated direction of a vehicle may be readily discernible to traffic and to pedestrians.

Another object of the invention is to provide a means that is ornamental and that is visible day or night.

A further object of the invention is to provide a means that is operable with the operating mechanism or which may be manually operated if desired.

With these and other objects in view reference is now made to the accompanying drawings in which—

Fig. 2 is a side elevation of the device showing means for mechanical operation;

Fig. 3 is a plan view of the crosshead;

Fig. 4 is a side elevation of the crosshead;

Fig. 5 is a transverse sectional view of an indicator;

Fig. 6 is an end elevation of the indicator;

Fig. 7 shows a fragment of the indicator;

Fig. 8 is a front elevation of the indicator;

Fig. 9 is a front elevation of part of the indicator;

Fig. 10 is a plan view of part of the indicator; and

Fig. 11 is an enlarged view of the frame for the forward indicator.

Figure 1:
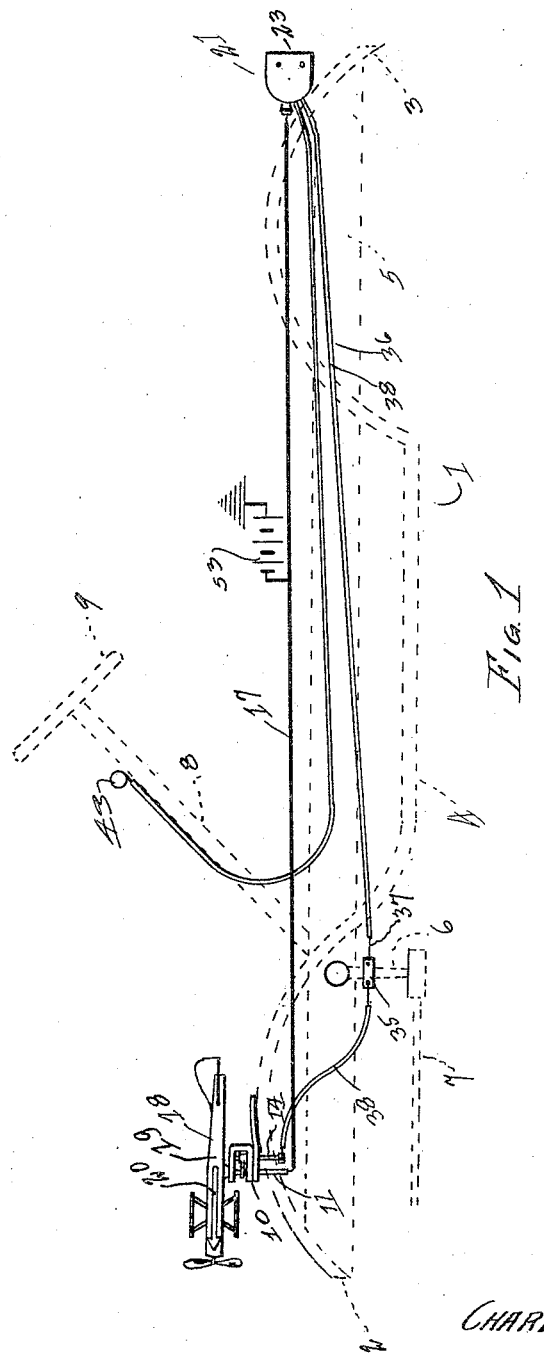
Fig. 1 is a side elevation of the device showing means used for manual operation.

Having reference to the drawings like numerals refer to like parts thruout the several views and the number (1) refers to a conventional representation of an automobile and showing a front fender (2) a rear fender (3) a running board (4) a frame (5) a steering arm (6) a steering connecting rod (7) a steering post (8) and a steering wheel (9).

Rigidly attached to the front fender (2) is a frame (10) carrying a rotatable spindle (11) on which is mounted a spur gear (12) engageable with a mutilated gear (13) mounted on a shaft (14) pivoted in the frame and carrying an arm (15) to which will be attached a sliding member to be explained.

The spindle is hollow, as shown at (16) to admit electric wires (17) and mounts on its upper end a forward indicator (18) which may be of any fanciful design.

The design shown represents a flying machine and the body (19) is of a size that will readily accommodate an electric globe, (not shown) and that will accommodate a transparent arrow (20) on either side thereon thru which the light may shine.

This forward indicator is rotatable with the spindle which acts as a pivot therefor, and is designed to rotate in an arc of half a circle with the movement ceasinig when the indicator is pointed at right angles to the longitudinal axis of the car.

Attached rigidly to the rear fender (3) by any suitable means, is a rear indicator (21) comprising a case (22) the face (23) of which is flat and provided with two apertures (24) separated by a cross-piece (25) with the forward portion (back) curved to form a reflector (26) integral with the indicator. Thru the center of the reflector is placed a light globe (27) which is electrically connected to the illuminating means by the wires (17).

This indicator is stationary and contains a plurality (in this case two) of rotatable indicating cylinders (28) and (29). Each of these cylinders have an open inner portion (30) and a closed outer portion (31) divided into three parts, two of which (32) and (33) are provided with transparent direction characters separated by an opaque strip (34).

By means of the open inner portion (30) the reflection rays from the globe (27) have a free path to and thru the transparent direction characters with the light totally eclipsed only when the opaque strip (34) is centrally positioned in the apertures (24), see Fig. 7, which occurs when the operating means is in a neutral position. The opaque strip also provides a marked break as the cylinder is moved from one exposure to another.

One of these cylinders is provided with the usual "right" and "left" indicating characters and this cylinder is connected to the steering arm (6) by any suitable fastening means (35) by a sliding member (36) consisting of a wire (37) slidably mounted in a tube (38) and connected to the cylinder by a lever (39) which carries a mutilated gear (40) which in turn registers with a spur pinion (41) attached to the cylinder. This sliding member continues forward to engage the arm (6) of the operating mechanism for the forward indicator and thus forms a continuous sliding operating member which joins both the forward and rear indicators and which causes them to operate in unison and with the motion of the steering arm.

The operation of the other of the cylinders (29) may be manual (see Fig. 1) at (43) or mechanical as shown in Fig. 2, which is my preferred form, and consists of a crosshead (44) to which is centrally attached a sliding member (45) similar in construction to the above mentioned sliding member (36), and joins the crosshead with the other cylinder in a like manner to the first mentioned sliding member.

A connecting rod (46) joins one end of the crosshead to the clutch lever (47) and the other end is operably positioned in juxtaposition with the sliding guide bar (48) of the transmission mechanism (49). This guide bar moves backward and forward with the lever (50) and when preparing to back out from a curb this lever is thrown in reverse which motion moves the guide bar (48) to the rear where, intercepting the crosshead (44) it moves the crosshead on the pivot (51) of the connecting rod (46) which is now stationary, and thus forces the sliding member (45) back which exposes the "Back O," indicating character. When preparing to stop the clutch lever is pressed forward and this movement of the crosshead moves the sliding member forward and displays the stop signal. A spring (52) maintains the crosshead in position to be engaged by the guide bar.

The indicators may be illuminated from a battery (53) as shown or from a generator (not shown) if desired.

In use the transmission lever displays the "Back O" signal as it is thrown in reverse, as above explained; then as the car proceeds to a turning point the steering wheel (9) is rotated and this moves the steering arm (6) which in turn moves the proper cylinder and displays the indicator character. This also turns the forward indicator so that either pedestrians or traffic may be properly directed.

Now in coming to a stop the clutch is released and this movement displays the "Stop" signal thru the medium of the crosshead, warning traffic from behind that the driver is about to stop the car.

Obviously these movements may be made manually but where operated mechanically they are automatic and need no attention.

With the lever (50) in the neutral position as shown in Fig. 2, the crosshead assumes a corresponding neutral position as shown in Fig. 3, and when in this position the opaque strip (30) is displayed.

The transparent direction characters will be of a material that will be plainly visible in the day time without the necessity of the electric lights which are obviously only used at night.

Having thus described my invention, I claim—

1. In a direction signal, a case, a reflector positioned in the back of said case, and provided with an illuminating means, a pair of indicating cylinders positioned parallel to each other, and rotatably mounted in said case, each of said cylinders being provided with a plurality of transparent indicating characters, and means for rotating each cylinder independenet of the other.

2. In a direction signal, a case, a reflector positioned at the back of said case, and provided with an illuminating means, a pair of cylinders positioned parallel to each other and rotatably mounted in said case, each of said cylinders being provided with a plurality of transparent indicating characters, each pair of said characters being separated by an opaque strip, and means for rotating each cylinder independent of the other.

3. In a direction signal, a case, a reflector positioned at the back of said case and provided with an illuminating means, a pair of cylinders rotatably mounted in said case, each of said cylinders having an open inner portion and a closed outer portion, said closed outer portion being divided into three parts, two of which parts are provided with transparent indicating characters, separated by an opaque strip, forming the third part, and means for rotating each cylinder independent of the other.

In testimony whereof I affix my signature.

CHARLES A. FRUITT.